ABSTRACT OF THE DISCLOSURE

3 - alkoxy - tetrahydro/hexahydro - 6H - dibenzo[b,d] pyran-9-ones and derivatives thereof useful as anti-inflammatory, hypocholesterolemic, anti-protozoal and dicotyledonous seed germination inhibitory agents and preparable by processes utilizing as the starting materials 7-alkoxy - 4 - methylcoumarin 3-propionate esters. Those starting materials are, alternatively, obtained by the alkylation of the corresponding 7-hydroxy-4-methyl-coumarin 3-propionate esters or by the condensation of a resorcinol monoalkyl ether with a dialkyl α-acetoglutarate.

---

The present invention is concerned with novel tricyclic compounds possessing the 6H-dibenzo[b,d]pyran ring structure and, more particularly, with 3-alkoxy-tetrahydro/hexahydro-6H-dibenzo[b,d]pyran-9-ones and derivatives thereof represented by the following structural formula

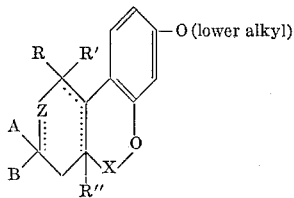

wherein R and R' can be hydrogen or a lower alkyl radical, R'' is hydrogen or a lower alkyl radical when the 6a,10a bond is saturated, X represents a carbonyl or methylene radical, A and B are hydrogen or together constitute a hydroxymethylene, (lower alkoxy)methylene, (hydrocarbon-substituted)aminomethylene or (lower alkyl)thiomethylene radical and Z is a member of the class consisting of carbonyl, hydroxymethylene, di(lower alkoxy)methylene, (lower alkylene)dioxymethylene and [α-(lower alkoxy)carbonyl - β - carboxyethyl]methylene radicals and the dotted lines indicate optional double bonds att he 6,10a; 8,9 and 10,10a positions.

The lower alkyl radicals symbolized in the foregoing structural representation are typified by methyl, ethyl, propyl, butyl, pentyl, hexyl, heptyl and the branched chain isomers thereof.

The lower alkoxy radicals are exemplified by methoxy, ethoxy, propoxy, butoxy, pentyloxy, hexyloxy, heptyloxy and the branched chain radicals isomeric therewith.

Representative of the lower alkylene radicals encompassed by that structural formula are methylene, ethylene, trimethylene, tetramethylene, pentamethylene and the branched chain isomers thereof.

The hydrocarbon radicals envisaged are typified by lower alkyl, as hereinbefore defined, and also aryl, as exemplified by phenyl and tolyl.

The compounds of this invention are conveniently manufactured by processes which utilize 7-alkoxy-4-methylcoumarin 3-propionate esters as the starting materials. Those materials, represented by the following structural formula

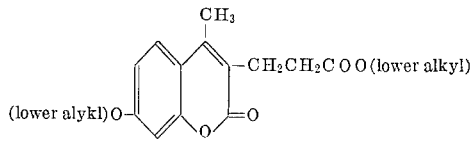

are alternatively obtained by alkylation of the corresponding 7-hydroxy compound or by condensation of the appropriate resorcinol alkyl ether with a dialkyl α-acetoglutarate. The reaction of ethyl 7-hydroxy-4-methylcoumarin 3-propionate with methyl iodide and potassium carbonate in acetone and the reaction of resorcinol monoethyl ether with diethyl α-acetoglutarate are thus alternate methods for the manufacture of ethyl 7-methoxy-4-methylcoumarin 3-propionate.

Cyclization of the aforementioned 7-alkoxy-4-methylcoumarin 3-propionate esters results in the corresponding instant 3-(lower alkoxy) - 7,8,9,10 - tetrahydro-6H-dibenzo[b,d]pyran-6,9-diones of the following structural formula

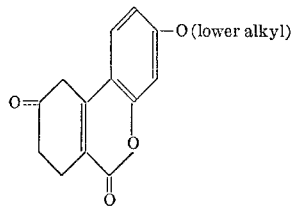

Typically, ethyl 7-methoxy-4-methylcoumarin 3-propionate is contacted with sodium hydride in dimethyl sulfoxide to effect cyclization, thus affording 3-methoxy-7,8,9,10-tetrahydro-6H-dibenzo[b,d]pyran-6,9-dione.

Alkylation of the instant 3-(lower alkoxy)-7,8,9,10-tetrahydro - 6H - dibenzo[b,d]pyran-6,9-diones, suitably with a lower alkyl iodide in the presence of a suitable acid acceptor results in the instant 10-alkyl and 10,10-dialkyl derivatives. 3-methoxy - 7,8,9,10 - tetrahydro-6H-dibenzo[b,d]pyran-6,9-dione thus is contacted with methyl iodide and potassium tertiary-butoxide to afford 3-methoxy-10-methyl - 7,8,9,10 - tetrahydro - 6H - dibenzo[b,d] pyran-6,9-dione, which is, in turn, contacted with those same reagents to produce 3-methoxy-10,10-dimethyl-7,8,9,10-tetrahydro-6H-dibenzo[b,d]pyran-6,9-dione.

Catalytic hydrogenation of the instant 9-ones results in the corresponding 9-hydroxy substances. 3-methoxy-7,8,9,10-tetrahydro - 6H - dibenzo[b,d]pyran-6,9-dione is thus converted to 9-hydroxy-3-methoxy-7,8,9,10-tetrahydro - 6H - dibenzo[b,d]pyran-6-one by reaction with hydrogen in the presence of a 5% palladium-on-carbon catalyst. That conversion is effected also by the use of sodium borohydride as the reducing agent.

The instant ketals are produced by reaction of the parent ketones with the appropriate alcohol or glycol, preferably in the presence of a suitable acid catalyst. 3-methoxy - 7,8,9,10 - tetrahydro-6H-dibenzo[b,d]pyran-6,9-dione is thus heated in benzene solution with ethylene glycol and a catalytic quantity of p-toluenesulfonic acid to produce 3 - methoxy-7,8,9,10-tetrahydro-6H-dibenzo-[b,d]pyran-6,9-dione 9-ethylene ketal.

Cleavage of the lactone moiety is effected by reaction with lithium aluminum hydride and the resulting dihydroxy compounds are cyclized to yield the instant 6-desoxo substances. 3-methoxy - 7,8,9,10 - tetrahydro-6H-dibenzo-[b,d]pyran-6,9-dione 9-ethylene ketal is thus heated with lithium aluminum hydride in ether to produce 2-(2-hydroxy-4-methoxyphenyl) - 1 - hydroxymethylcyclohex-1-en - 4 - one 4-ethylene ketal, which is refluxed with aqueous acetic acid and pyridine to yield 3-methoxy-6a,7,8,9-tetrahydro-6H-dibenzo[b,d]pyran-9-one. Reduction of the 10,10a double bond of those substances with lithium and liquid ammonia affords the corresponding hexahydro substances. 3 - methoxy-6a,7,8,9-tetrahydro-6H-dibenzo[b,d] pyran-9-one is, in that manner, converted to 3-methoxy-6a,7,8,9,10,10a-hexahydro-dibenzo[b,d]pyran-9-one.

Reaction of the instant 9-ones with ethyl formate in the presence of an alkaline catalyst affords the corresponding 8-hydroxymethylene derivatives. Conversion of the latter substances to the corresponding 8-(lower alkoxy) methylene substances is affected by reaction with the appropriate lower alkyl halide. These compounds are particularly suitable as intermediates in the preparation of the instant 10,10-dialkyl derivatives. The latter series of reactions is exemplified by the hydroxymethylenation of 3 - methoxy - 10-methyl - 6a,7,8,9,10,10a-hexahydro-6H-dibenzo[b,d]pyran-9-one with ethyl formate and potassium tertiary butoxide, reaction if the resulting 8-hydroxymethylene derivative with 2-iodopropane and potassium carbonate and alkylation of that 8-isopropoxymethylene compound with methyl iodide in the presence of lithium and liquid ammonia to afford the corresponding 10,10-dimethyl derivative. Heating of those 8-(lower alkoxy) methylene compounds with aqueous mineral acid affords the corresponding 8-hydroxymethylene substances, which are contacted with an aqueous alkaline reagent to remove the hydroxymethylene function. The aforementioned 8-isopropoxymethylene - 3 - methoxy - 10,10 - dimethyl-6a,7,8,9,10,10a - hexahydro - 6H - dibenzo[b,d]pyran-9-one is allowed to react with methanolic hydrochloric acid to produce the corresponding 8-hydroxymethylene compound, which is heated with aqueous sodium carbonate, thus affording 3-methoxy-10,10-dimethyl-6a,7,8,9,10,10a-hexahydro-6H-dibenzo[b,d]pyran-9-one.

Reaction of the instant 8-hydroxymethylene compounds with an amine affords the corresponding (hydrocarbon-substituted)aminomethylene compounds and reaction with a mercaptan the (lower alkyl)thiomethylene derivatives.

The compounds of this invention are useful as a result of their valuable pharmacological activity. They are, for example, anti-inflammatory and hypotensive agents. In addition, they exhibit anti-protozoal activity as is evidenced by their ability to inhibit the growth of such organisms as *Tetrahymena geleii*. They possess the ability also to inhibit the germination of dicotyledonous seeds. These substances can be administered in any of a number of conventional pharmaceutical forms and also by conventional routes. For oral administration suitable solid forms are pills, powders, capsules, tablets and the like and suitable liquid forms are syrups, emulsions, elixirs, suspensions and the like. For parenteral administration these compounds can be dispersed in an aqueous suspension or dissolved in a pharmacologically acceptable oil or oil-water emulsion. Suitable excipients can also be added.

The pharmacological activity of the novel compounds of the present invention is specifically illustrated by the anti-inflammatory activity of 3 - methoxy-7,8,9,10-tetrahydro-6H-dibenzo[b,d]pyran - 6,9 - dione, 3-methoxy-10-methyl - 7,8,9,10 - tetrahydro-6H-dibenzo[b,d]pyran-6,9-dione, 8-hydroxymethylene - 3 - methoxy-6a,7,8,9,10,10a-hexahydro-6H-dibenzo[b,d]pyran - 9 - one and 8-isopropoxymethylene - 3 - methoxy-10-methyl - 6a,7,8,9,10,10a-hexahydro-6H-dibenzo[b,d]pyran - 9 - one when administered subcutaneously to rats at a dose of 25 milligrams. The following assay was used:

Each of a group of 10 intact male rats weighing 100–130 grams is injected under the plantar surface of each hind foot with 0.1 ml. of a 1% solution of carrageenin (Type 402, Marine Colloids, Inc.). The test compound, dissolved or suspended in saline, corn oil or propylene glycol, is administered subcutaneously one hour prior to the carrageenin injection. Another such group serving as controls is treated in the identical manner save for omission of the test compound. The edema resulting from carrageenin injection is determined by measuring the circumference of the hind feet, in arbitrary units, 5 hours after the carrageenin injection and substracting the average swelling of the group treated with the test compound from the average swelling of the control group. Compounds are rated active if they produce a significant decrease ($P<0.05$) in the swelling observed in control animals.

In that assay the aforementioned 3-methoxy-7,8,9,10-tetrahydro-6H-dibenzo[b,d]pyran-6,9-dione, 3 - methoxy-10 - methyl - 7,8,9,10-tetrahydro-6H-dibenzo[b,d]pyran-6,9-dione, 8-hydroxymethylene - 3 - methoxy-6a,7,8,9,10,10a-hexahydro-6H-dibenzo[b,d]pyran-9-one and 8 - isopropoxymethylene - 3 - methoxy-10-methyl-6a,7,8,9,10,10a-hexahydro - 6H - dibenzo[b,d]pyran-9-one were observed to produce a significant decrease in swelling.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.) and quantities of materials in parts by weight unless otherwise noted.

EXAMPLE 1

Method A

To a solution of 300.5 parts of ethyl 7-hydroxy-4-methylcourmarin 3-propionate and 425 parts of methyl iodide in 800 parts of acetone is added 240 parts of potassium carbonate and the resulting reaction mixture is heated with stirring at the reflux temperature for about 3½ hours. At the end of that time 280 parts of potassium carbonate and 240 parts of methyl iodide are added and heating at the reflux temperature is continued for an additional four hours. The reaction mixture is then filtered; the filter cake is washed with acetone and the combined filtrate and washings are concentrated to dryness, then dissolved in ether. The ether solution is washed successively with dilute aqueous sodium hydroxide and water, then dried over anhydrous potassium carbonate and partially concentrated in order to induce crystallization. Ethyl 7-methoxy-4-methylcoumarin 3-propionate crystallizes as colorless needles, melting at about 74–75.5°, displaying infrared absorption maxima at about 5.83 and 6.21 microns and also an ultraviolet absorption maximum at about 322 millicrons with a molecular extinction coefficient of about 17,820.

Method B

A solution containing 3.7 parts of resorcinol monomethyl ether, 6.9 parts of of diethyl α-acetoglutarate and 4.2 parts of boron trifluoride etherate in 35 parts of benzene is heated at the reflux temperature for about nine hours, during which time the water formed is continuously separated. The reaction mixture is then cooled, poured into aqueous sodium bicarbonate, stirred for approximately two hours and extracted with benzene. The benzene solution is washed successively with dilute aqueous potassium hydroxide and water, then dried over anhydrous sodium sulfate and concentrated to dryness under reduced pressure. Distillation of the resulting residue at 0.5 mm. affords ethyl 7-methoxy-4-methylcoumarin 3-propionate, boiling at 205–210° and identical with the product of Method A.

EXAMPLE 2

To a solution of 100 parts of ethyl 7-methoxy-4-methylcoumarin 3-propionate in 400 parts by volume of dimethyl sulfoxide is added 15 parts of 56% sodium hydride mull in mineral oil and the resulting mixture is stirred at room temperature for about two hours. The resulting dark brown reaction mixture is neutralized by the addition of approximately 25 parts of acetic acid, then is diluted with approximately 500 parts of water. The crystals which form are collected by filtration, washed on the filter first with water then with ether in order to afford the crude product, melting at about 222–224°. Recrystallization of that material from dioxane affords pure 3-methoxy - 7,8,9,10-tetrahydro-6H-dibenzo[b,d]pyran-6,9-dione, melting at about 228.5°. It exhibits infrared absorption maxima at about 5.81 and 6.17 microns, an ultraviolet absorption maximum at about 319 millimicrons with a molecular extinction coefficient of about 16,240 and is represented by the following structural formula

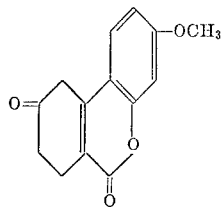

EXAMPLE 3

To a solution of 26.3 parts of 3-methoxy-7,8,9,10-tetrahydro-6H-dibenzo[b,d]pyran-6,9-dione and 13.5 parts of potassium tertiary-butoxide in 250 parts by volume of dimethyl sulfoxide is added successively 48 parts of tertiary-butyl alcohol and 228 parts of methyl iodide. The resulting reaction mixture is heated at the reflux temperature for about 15 minutes, then is stripped of excess methyl iodide by distillation under reduced pressure and poured into approximately 500 parts of ice water. The resulting mixture is stored at 0–5° for about 16 hours, then is filtered in order to remove unreacted starting material. The acetone filtrate is partially concentrated, then is diluted with methanol, resulting in crystallization of the crude product as pale yellow crystals. Recrystallization of that material from methanol affords pure 3-methoxy-10-methyl-7,8,9,10-tetrahydro - 6H-dibenzo[b,d] pyran-6,9-dione, melting at about 135°. This compound exhibits infrared absorption maxima at about 5.82 and 6.19 microns and an untraviolet absorption maximum at about 322 millimicrons with a molecular extinction coefficient of about 15,000. This compound is represented by the following structural formula

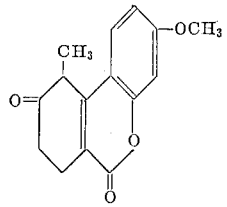

From the methanol mother liquors, there is obtained after recrystallization from acetone, 3-methoxy-10-methyl-7,8,9,10-tetrahydro-6H-dibenzo[b,d]pyran-6,9-dione 9-dimethyl ketal, melting at about 159°.

EXAMPLE 4

To a solution of 5.2 parts of 3-methoxy-10-methyl-7,8,9,10-tetrahydro - 6H - dibenzo[b,d]pyran-6,9-dione in 70 parts by volume of dimethyl sulfoxide is added 2.4 parts of potassium tertiary-butoxide and that mixture is stirred for about 15 minutes in order to effect solution. At the end of that time, 12 parts of tertiary-butyl alcohol and 45.6 parts of methyl iodide are added and that reaction mixture is stirred at room temperature for about 30 minutes, then is heated at the reflux temperature for about 20 minutes. The reaction mixture is then cooled and poured into ice water and the resulting aqueous mixture is extracted with ether. The ether extract is washed successively with dilute aqueous potassium hydroxide and water, then dried over anhydrous potassium carbonate and concentrated to dryness under reduced pressure. The resulting crystalline residue is purified by recrystallization from chloroform-ether to afford pale yellow needle-like crystals of 3-methoxy-10,10-dimethyl-7,8,9,10-tetrahydro-6H-dibenzo[b,d]pyran-6,9-dione, melting at about 186.5–188°. This compound exhibits infrared absorption maxima at about 5.80, 6.14 and 6.21 microns and an ultraviolet absorption maximum at about 321 millimicrons with a molecular extinction coefficient of about 15,000. It is represented by the following structural formula

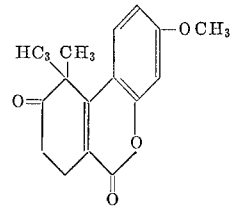

The mother liquors from the latter crystallization are chromotagraphed on a silica gel column, and that column is eluted with 5% ethyl acetate in benzene. The fraction thus obtained is purified by recrystallization from benzene to afford rectangular crystals of 3-methoxy-6a,10-dimethyl-6a,7,8,9-tetrahydro - 6H - dibenzo[b,d]pyran-6,9-dione, melting at about 156.5°. It exhibits infrared absorption maxima at about 5.64, 5.96 and 6.17 microns and also ultraviolet absorption maxima at about 229 and 317 millimicrons with molecular extinction coefficients of about 18,200 and 10,200, respectively. It is represented by the following structural formula

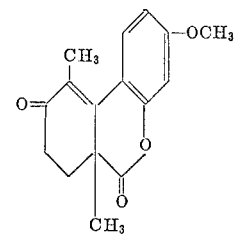

EXAMPLE 5

A mixture containing 6 parts of 3-methoxy-7,8,9,10-tetrahydro-6H-dibenzo[b,d]pyran-6,9-dione, 1.2 parts of 5% palladium-on-carbon catalyst and 262.5 parts of warm acetic acid is shaken with hydrogen at an initial pressure of 50 pounds per square inch for about 46 hours. The catalyst is removed by filtration and washed on the filter with acetone. The combined filtrate and washings are concentrated to dryness and the resulting residue is recrystallized from acetone to afford crystals of the crude product. Recrystallization from dioxane affords pure 3-methoxy-9-hydroxy-6H-dibenzo[b,d]pyran-6-one, melting at about 274°.

The mother liquor from the latter recrystallization is partially concentrated and the crystalline material which separates is further purified by recrystallization from dioxane, thus yielding 3-methoxy-9-hydroxy-7,8,9,10-tetrahydro-6H-dibenzo[b,d]pyran - 6 - one, melting at about 182°. This compound is represented by the following structural formula

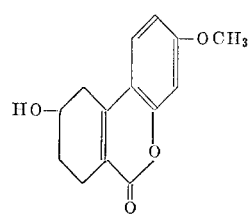

EXAMPLE 6

A suspension containing 20 parts of 3-methoxy-7,8,9,10-tetrahydro-6H-dibenzo[b,d]pyran-6,9-dione, 5 parts of sodium borohydride and 320 parts of ethanol is stirred at room temperature for about 3 hours. The crystals which form are separated by filtration, washed on the filter first with water, then with ethanol and finally purified by recrystallization from dioxane, thus producing 3-methoxy-9-hydroxy-7,8,9,10-tetrahydro - 6H - dibenzo-[b,d]pyran-6-one, identical with the product of Example 5.

EXAMPLE 7

A suspension containing 150 parts of 3-methoxy-7,8,9,-10-tetrahydro-6H-dibenzo[b,d]pyran - 6,9 - dione, 255.3 parts of ethylene glycol, 1 part of p-toluenesulfonic acid and 1320 parts of benzene is heated at the reflux temperature for about 8 hours, during which time the water formed is continuously removed. The reaction mixture is then cooled, washed with aqueous potassium carbonate, dried over anhydrous sodium sulfate and partially concentrated to induce crystallization. The resulting crystals are collected by filtration and dried to afford 3-methoxy-7,8,9,10 - tetrahydro-6H-dibenzo[b,d]pyran-6,9-dione 9-ethylene ketal, melting at about 145.5°. This compound exhibits infrared absorption spectral peaks at about 5.82 and 6.19 microns and an ultraviolet absorption maximum at about 319 millimicrons with a molecular extinction coefficient of about 17,300. This compound is represented by the following structural formula

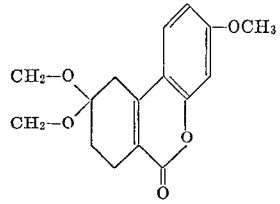

EXAMPLE 8

A suspension containing 18 parts of 3-methoxy-10,10-dimethyl - 7,8,9,10 - tetrahydro-6H-dibenzo[b,d]pyran-6,9-didone, 55.5 parts of ethylene glycol, 0.5 part of p-toluenesulfonic acid and 440 parts of benzene is heated at the reflux temperature for about 48 hours, during which time the water of reaction is continuously removed. The reaction mixture is then cooled, washed with aqueous potassium carbonate, dried over anhydrous sodium sulfate and partially concentrated. The crystals which form are collected by filtration and dried to afford 3-methoxy-10,10-dimethyl - 7,8,9,10-tetrahydro-6H-dibenzo[b,d]pyran-6,9-dione 9-ethylene ketal, melting at about 179–180°. Infrared absorption maxima are observed at about 5.79 and 6.14 microns. This compound displays also an ultraviolet absorption maximum at about 319 millimicrons with a molecular extinction coefficient of about 14,600. It is represented by the following structural formula

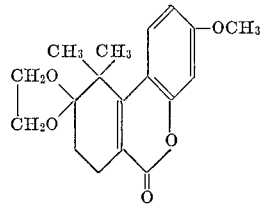

EXAMPLE 9

Method A

A suspension containing 10 parts of 3-methoxy-7,8,9,10-tetrahydro-6H-dibenzo[b,d]pyran-6,9-dione 9 - ethylene ketal and 3.5 parts of lithium aluminum hydride in 350 parts of ether is heated at the reflux temperature for about 12 hours, then is cooled to about 0–5°. To that cold mixture is added successively 18 parts of concentrated sulfuric acid and a solution of 3.15 parts of acetic acid in 250 parts of water. Extraction of the acidic mixture with ether affords an organic solution, which is separated, washed successively with water and dilute aqueous sodium bicarbonate, then dried over anhydrous sodium sulfate and concentrated to dryness to afford as a pale yellow glass, 2-(2-hydroxy-4-methoxy-phenyl)-1-hydroxymethylcyclohex-1-en-4-one 4-ethylene ketal. To that material is added 262.5 parts of acetic acid, 200 parts of water and 50 parts of pyridine and the resulting mixture is heated at the reflux temperature for about 29 hours, then is concentrated and diluted with water. That mixture is extracted with ether and the ether solution is separated, washed successively with water, cold dilute aqueous potassium hydroxide and water, then dried over anhyddrodus sodium sulfate. Removal of the solvent by distillation under reduced pressure affords a residue, which is recrystallized from a mixture of chloroform and ether to yield colorless needle-like crystals of 3-methoxy-6a-7,8,9-tetrahydro-6H-dibenzo[b,d]pyran-9-one melting at about 126°. Infrared absorption maxima are observed at about 5.99 and 6.24 microns and ultraviolet absorption peaks at about 346, 303, and 247.5 millimicrons with molecular extinction coefficients of about 20, 100, 12,000 and 6,900 respectively. This compound is represented by the following structural formula

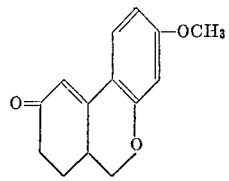

The potassium hydroxide washings from the latter procedure are made acidic by the addition of hydrochloric acid, then are extracted with ether. The ether extract is washed with water, dried over anhydrous sodium sulfate and concentrated to dryness to afford a residue, which is purified by recrystallization from benzene, thus yielding yellow needle-like crystals of 3-(2-hydroxy-4-methoxyphenyl)-4-methylenecyclohex-2-en-1-one, melting at about 116.5–117.5°. This compound exhibits infrared absorption maximum at about 6.00 and 6.16 microns and an ultraviolet absorption peak at about 276 millimicrons with a molecular extinction coefficient of about 11,500.

Method B

A mixture containing 2-(2-hydroxy-4-methoxyphenyl)-1-hydroxymethylcyclohex - 1 - en-4-one 4-ethylene ketal (prepared as described in Example 9 from 10 parts of 3-methoxy - 7,8,9,10 - tetrahydro-6H-dibenzo[b,d]pyran-6,9-dione 2-ethylene ketal) 250 parts of acetic acid, 200 parts of water and 50 parts of pyrrolidine is heated at the reflux temperature for about 29 hours. then is cooled, partially concentrated and diluted with water. Extraction of that aqueous mixture with ether affords an organic solution, which is washed successively with water, cold dilute aqueous potassium hydroxide and water, then dried over anhydrous sodium sulfate. Removal of the solvent by distillation under reduced pressure affords colorless needle-like crystals of 3-methoxy-6a,7,8,9-tetrahydro-6H-dibenzo-[b,d]pyran-9-one, identical with the product of Method A.

Method C

When 20 parts of potassium hydroxide is substituted for pyrrolidine in the procedure of Method B, there is obtained 3-methoxy-6a,7,8,9-tetrahydro-6H-dibenzo[b,d] pyran-9-one, identical with the product of Methods A and B.

EXAMPLE 10

To a suspension of 2.3 parts of 3-methoxy-6a,7,8,9-tetrahydro-6H-dibenzo[b,d]pyran-9-one with 70 parts of ether and 175 parts of liquid ammonia is added 0.5 part of lithium metal and the resulting reaction mixture is stirred for about one hour, then cooled to approximately −70° and decomposed by the addition of a single portion of 6 parts of ammonium chloride. The ammonia is then allowed to evaporate and the residual mixture is extracted with ether. The ether layer is separated, washed thoroughly with water, dried over anhydrous sodium sulfate, then concentrated to dryness. Recrystallization from chloroform-ether affords colorless needle-like crystals of the crude product, melting at about 122–125.5°. A second recrystallization from chloroform-ether affords pure 3-methoxy - 6a,7,8,9,10,10a - hexahydro-6H-dibenzo[b,d] pyran-9-one, melting at about 129–130.5°. This compound is represented by the following structural formula

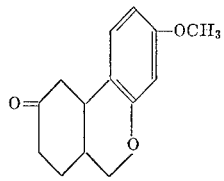

EXAMPLE 11

The procedure of Example 10 is repeated with the exception that the ammonium chloride is added gradually in portions. Recrystallization from chloroform-ether of the product thus obtained affords colorless needle-like crystals of 3 - methoxy - 6a,7,8,9,10,10a - hexahydro-6H-dibenzo-[b,d]pyran-9-ol. This substance is obtained in two polymorphic forms, one melting at about 104–105° and the other at about 118.5°. It is represented by the following structural formula

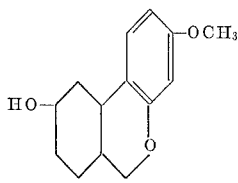

EXAMPLE 12

To a suspension of 13.8 parts of 3-methoxy-6a,7,8,9-tetrahydro-6H-dibenzo[b,d]pyran-9-one in 140 parts of ether and 210 parts of liquid ammonia is added one part of lithium metal and the resulting resulting reaction mixture is stirred for about 25 minutes, at the end of which time the blue color has disappeared. An additional small quantity of lithium metal is then added and the mixture is stirred for about 20 minutes, at which time the mixture remains blue. It is then cooled to approximately —70° and 45.6 parts of methyl iodide is added. The cooling bath is removed and the mixture is stirred for approximately four hours at the reflux temperature, at the end of which time the ammonia is allowed to evaporate. The residual mixture is washed successively with aqueous potassium hydroxide, water and dilute hydrochloric acid, then filtered to remove the precipitate and washed with water. Drying of that solution over anhydrous potassium carbonate followed by removal of the solvent by means of distillation under reduced pressure affords colorless needle-like crystals of the crude product, melting at about 92°. Recrystallization of that material from chloroform-ether yields 3 - methoxy-10-methyl-6a,7,8,9,10,10a-hexahydro-6H-dibenzo[b,d]pyran-9-one melting at about 95°. It exhibits an infrared absorption maximum at about 5.83 microns and also ultraviolet absorption maxima at about 282.5 and 288 millimicrons with molecular extinction coefficients of about 3,040 and 2,790, respectively. This compound is represented by the following structural formula

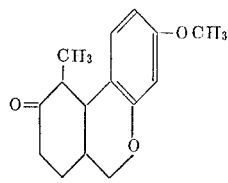

EXAMPLE 13

To a solution of 2.3 parts of 3-methoxy-6a,7,8,9,10,10a-hexahydro-6H-dibenzo[b, d]pyran-9-one and two parts of ethyl formate in 26.4 parts of benzene is added 2.3 parts of potassium tertiary-butoxide. The resulting reaction mixture is stirred at room temperature, under nitrogen, for about 5 hours, then is allowed to stand at room temperature for about 16 hours. At the end of that time the mixture is diluted with ice water and the aqueous layer is separated, washed with ether, then acidified with hydrochloric acid to a pH of about 3. Cooling at 0.5° results in crystallization of the product, which is dried to afford the crude material, melting at about 153.5°. Recrystallization of that substance from benzene affords pure 8 - hydroxymethylene - 3 - methoxy-6a,7,8,9,10,10a-hexahydro-6H-dibenzo[b,d]pyran-9-one, melting at about 156–156.5°. This compound exhibits infrared absorption maxima at about 3.50 and 6.03 microns and also ultraviolet absorption maxima at about 289 and 313 millimicrons with molecular extinction coefficients of about 9,300 and 14,300 respectively.

EXAMPLE 14

When an equivalent quantity of 3-methoxy-10-methyl-6a,7,8,9,10,10a - hexahydro-6H-dibenzo[b,d]pyran-9-one is substituted in the procedure of Example 13, there is produced, after recrystallization from benzene, pure 8-hydroxymethylene - 3 - methoxy-10-methyl-6a,7,8,9,10,10a - hexahydro-6H-dibenzo[b,d]pyran-9-one, melting at about 126°. This compound exhibits infrared absorption maxima at about 3.60 and 6.07 microns and also ultraviolet absorption peaks at about 282.5 and 288.5 millimicrons with molecular extinction coefficients of about 11,200 and 11,100, respectively. It is represented by the following structural formula

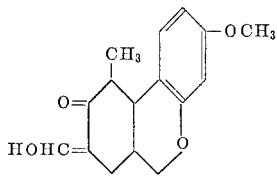

EXAMPLE 15

A solution containing 2.6 parts of 8-hydroxy-methylene-3-methoxy - 6a,7,8,9,10,10a - hexahydro - 6H - dibenzo[b,d]pyran-9-one, 1.1 parts of n-butyl mercaptan and 0.04 part of p-toluenesulfonic acid in 35.2 parts of benzene is heated at the reflux temperature for about two hours, during which time the water of reaction is continuously removed. The reaction mixture is then cooled, diluted with benzene, washed successively with aqueous sodium bicarbonate and aqueous sodium chloride, then dried over anhydrous sodium sulfate and concentrated to dryness under reduced pressure. Recrystallization of the resulting residue from benzene-cyclohexane yields pure 8 - n - butylthiomethylene - 3 - methoxy-6a,7,8,9,10,10a-hexahydro-6H-dibenzo[b,d]pyran-9-one, melting at about 142–143°. It displays infrared absorption maxima at about 6.01 and 6.47 microns and also an ultraviolet absorption maximum at about 312 millimicrons with a molecular extinction coefficient of about 19,000. This compound is represented by the following structural formula

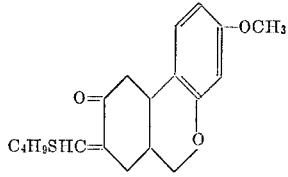

EXAMPLE 16

A mixture containing 2.7 parts of 8-hydroxymethylene-10 - methyl - 3 - methoxy-6a,7,8,9,10,10a-hexahydro-6H-dibenzo[b,d]pyran-9-one, 2.7 parts of potassium carbonate and 3.5 parts of 2-iodopropane in 40 parts of butanone is heated at the reflux temperature for about 6 hours, then is cooled and diluted with ice water. Extraction of the resulting aqueous mixture with ether affords an organic solution, which is washed successively with cold aqueous potassium hydroxide and water, then dried over potassium carbonate and concentrated to dryness in an atmosphere of nitrogen. Crystallization of the resulting residue from cyclohexane-heptane affords pale yellow needle-like crystals of 8-isopropoxymethylene-3-methoxy-10-methyl - 6a,7,8,9,10,10a - hexahydro - 6H - dibenzo-[b,d]pyran-9-one, melting at about 135°. Infrared absorption maxima are observed at about 5.98 and 6.32 microns and ultraviolet absorption peaks at about 281.5 and 288 millimicrons with molecular extinction coefficients of about 18,900 and 17,200, respectively.

EXAMPLE 17

To 210 parts of liquid ammonia containing approximately 0.1 part of ferric nitrate is added 0.4 part of metallic sodium and that mixture is stirred until the blue color disappears. At that time a solution of 3.15 parts of 8-isopropoxymethylene - 3 - methoxy - 10 - methyl-6a,7,8,9,10,10a - hexahydro - 6H - dibenzo[b,d]pyran-9-one in 25 parts of dioxane is added. That mixture is stirred at the reflux temperature for about one hour; 5 parts of methyl iodide is then added. Stirring at the reflux temperature is continued for an additional hour and the mixture is then allowed to stand for about 16 hours, during which time the ammonia evaporates. The resulting mixture is extracted with ether and the ether solution is separated, then washed successively with water, dilute aqueous potassium hydroxide, water and dilute hydrochloric acid. The acidic washing is made alkaline, then is extracted with chloroform. The chloroform solution is washed with water, dried over anhydrous sodium sulfate and concentrated to afford the gummy crude product. That material crystallizes upon standing and is purified by recrystallization first from chloroform-ether then from benzene, thus producing 10-methyl - 8 - methylaminomethylene-3-methoxy-6a,7,8,9,10,10a - hexahydro - 6H-dibenzo[b,d]pyran-9-one, melting at about 183.5–185°. This compound exhibits infrared absorption maxima at about 3.15 and 6.05 microns and also an ultraviolet absorption maximum at about 328 millimicrons with a molecular extinction coefficient of about 21,300. It is represented by the following structural formula

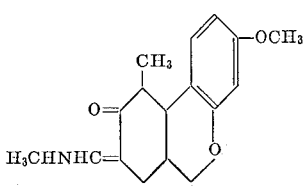

EXAMPLE 18

A mixture containing 3.02 parts of potassium metal and 49 parts of tertiary-butyl alcohol is heated at the reflux temperature for about two hours, then is cooled and 12.9 parts of dimethyl succinate is added. That mixture is then added dropwise, over a period of about 40 minutes at approximately 50° in a nitrogen atmosphere, to 2.5 parts of 3-methoxy-6a,7,8,9,10,10a-hexahydro-6H-dibenzo[b,d]pyran-9-one. The resulting reaction mixture is then stirred at that temperature for about 90 minutes longer. The cooled mixture is diluted with water, washed with ether and acidified by the addition of approximately 15 parts by volume of 1:1 hydrochloric acid. The product separates as an oily material which begins to crystallize upon standing. Extraction of that crystalline material with chloroform affords an organic solution, which is washed with water, dried over anhydrous sodium sulfate and concentrated to dryness under reduced pressure. The resulting residue is crystallized from ether to afford the crude product, melting at about 173–177°. Purification by recrystallization from ethanol yields pure 3-methoxycarbonyl-3(3-methoxy - 6a,7,10,10a - tetrahydro-6H-dibenzo[b,d]pyran-9 - yl)propionic acid, melting at about 178–181°. It is represented by the following structural formula

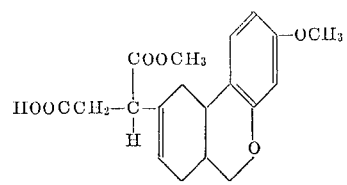

EXAMPLE 19

To a mixture of 126 parts liquid ammonia and approximately 0.1 part of feric nitrate is added 4 parts of metallic potassium in small portions over a period of about two hours. The resulting mixture is stirred until the blue color disappears, at which time 105 parts of ether is added with vigorous stirring and that mixture is stirred while the ammonia is allowed to evaporate. To that mixture is then added a solution of 3.16 parts of 8-isopropoxymethylene-3-methoxy-10 - methyl - 6a,7,8,9,10,10a-hexahydro-6H-dibenzo[b,d]pyran-9-one in 25 parts of dioxane. The mixture is stirred vigorously for about five minutes, at the end of which time 28.4 parts of methyl iodide is added dropwise over a period of about five minutes. Stirring is continued for about ten minutes and an additional 28.4 parts of methyl iodide is added. That mixture is allowed to react with stirring for an additional 2 hours, then is diluted with a small quantity of water, washed successively with dilute aqueous potassium hydroxide, water, dilute hydrochloric acid and water, dried over anhydrous sodium sulfate and concentrated to dryness, thus affording, as a partially crystalline amber-colored product, 8 - isopropoxymethylene - 3-methoxy-10,10 - dimethyl - 6a,7,8,9,10,10a-hexahydro-6H-dibenzo-[b,d]pyran-9-one.

The latter material is dissolved in a solution containing 32 parts of methanol, 2 parts of water and 0.15 part of concentrated hydrochloric acid and that reaction mixture is allowed to stand at room temperature for about three hours, then is poured into dilute aqueous potassium hydroxide. That alkaline solution is washed with ether, then is acidified with hydrochloric acid. Extraction of the resulting acidic mixture with ether affords an organic solution, which is washed with dilute aqueous sodium chloride, dried over anhydrous sodium sulfate and concentrated to dryness. Recrystallization of the residue from benzenecyclohexane affords 8 - hydroxymethylene - 3-methoxy-10,10-dimethyl-6a,7,8,9,10,10a - hexahydro-6H-dibenzo[b,d]pyran-9 - one melting at about 147.5–150°. That material is dissolved in 150 parts by volume of 20% aqueous sodium carbonate and the resulting solution is heated at the reflux temperature for about two hours, then is cooled and extracted with ether. The ether solution is dried over anhydrous potassium carbonate and concentrated to dryness. Purification of that material by thin layer chromatography on silica gel followed by elution with benzene followed by recrystallization from ether affords 3-methoxy-10,10-dimethyl - 6a,7,8,9,10,10a-hexahydro-6H-dibenzo[b,d]pyran-9 - one, melting at about 91–93°. It exhibits an infrared absorption maximum at about 5.82 microns and ultraviolet absorption maxima at about 282 and 288 millimicrons with molecular extinction coefficients of about 3,490 and 3,120, respectively, and is represented by the following structural formula

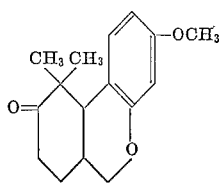

EXAMPLE 20

A mixture containing 9 parts of 8-hydroxymethylene-10-methyl - 3 - methoxy-6a,7,8,9,10,10a-hexahydro-6H-dibenzo[b,d]pyran-9-one, 3.7 parts of N-methylaniline, 0.05 part of p-toluenesulfonic acid and 130 parts of toluene is heated at the reflux temperature for about 3 hours, during which time the water of reaction is continuously removed. At the end of that reaction period the mixture is diluted with benzene, then washed with aqueous potassium carbonate, dried over anhydrous sodium sulfate and concentrated to dryness under reduced pressure. The resulting residue is purified by recrystallization from benzene-cyclohexane to afford 10 - methyl-(N-methylphenylamino)methylene - 3 - methoxy - 6a,7,8,9,10,10a-hexahydro-6H-dibenzo[b,d]pyran - 9 - one, melting at about 168–169.5°. This compound is represented by the following structural formula

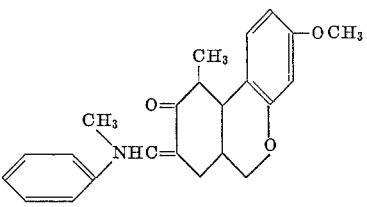

What is claimed is:
1. A compound of the formula

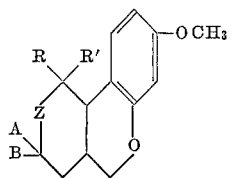

wherein A and B are hydrogen or together consitute a hydroxymethylene, isopropoxymethylene, methylaminomethylene, N-methyl-N-phenylaminomethylene or butylthiomethylene radical, R and R' are members of the class consisting of hydrogen and a methyl radical, and Z is selected from the group consisting of carbonyl and hydroxymethylene radicals.

2. As in claim 1, a compound of the formula

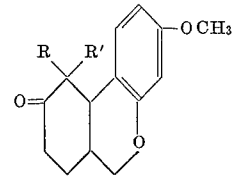

wherein R and R' are members of the class consisting of hydrogen and a methyl radical.

3. As in claim 1, the compound which is 3-methoxy-6a,7,8,9-tetrahydro-6H-dibenzo[b,d]pyran-9-one.

4. As in claim 1, the compound which is 3-methoxy-6a,7,8,9,10,10a-hexahydro-6H - dibenzo[b,d]pyran - 9-one.

5. As in claim 1, the compound which is 3-methoxy-10-methyl-6a,7,8,9,10,10a-hexahydro - 6H - dibenzo[b,d]pyran-9-one.

6. An in claim 1, the compound which is 3-methoxy-10,10 - dimethyl - 6a,7,8,9,10,10a - hexahydro - 6H - dibenzo[b,d]pyran-9-one.

7. As in claim 1, the compound which is 3-methoxycarbonyl-3-(3-methoxy-6a,7,10,10a - tetrahydro - 6H-dibenzo[b,d]pyran-9-yl)propionic acid.

References Cited

UNITED STATES PATENTS 3,388,136  6/1968  Taylor et al. _____ 260—345.3

OTHER REFERENCES

Mechoulam et al., J. Am. Chem. Soc., vol. 87, pp. 3273–5 (1965).

HENRY R. JILES, Primary Examiner

J. M. FORD, Assistant Examiner

U.S. Cl. X.R.

260—240, 340.9, 343.2, 999; 424—283